(12) United States Patent
Bienek

(10) Patent No.: US 9,317,793 B2
(45) Date of Patent: Apr. 19, 2016

(54) PRODUCT WITH APPLIED, VISIBLE PRODUCT INFORMATION AND METHOD FOR APPLYING VISIBLE PRODUCT INFORMATION TO A PRODUCT

(71) Applicant: SIEMENS AKTIENGESELLSCHAFT, Munich (DE)

(72) Inventor: Frank Bienek, Wolfenbuettel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/414,168

(22) PCT Filed: Jun. 25, 2013

(86) PCT No.: PCT/EP2013/063268
§ 371 (c)(1),
(2) Date: Jan. 12, 2015

(87) PCT Pub. No.: WO2014/009144
PCT Pub. Date: Jan. 16, 2014

(65) Prior Publication Data
US 2015/0199601 A1 Jul. 16, 2015

(30) Foreign Application Priority Data
Jul. 10, 2012 (DE) .......... 10 2012 212 026

(51) Int. Cl.
*G06K 19/06* (2006.01)
*G06K 19/077* (2006.01)
*G06Q 10/08* (2012.01)

(52) U.S. Cl.
CPC .... *G06K 19/06112* (2013.01); *G06K 19/07707* (2013.01); *G06Q 10/087* (2013.01)

(58) Field of Classification Search
CPC .......... G06K 5/00; G06K 7/00; G06K 19/06; G06K 19/00; G06K 7/10; G06F 17/00
USPC ............... 235/494, 472.02, 462.46, 375, 487, 235/492, 462.36
See application file for complete search history.

(56) References Cited

U.S. PATENT DOCUMENTS

| | | |
|---|---|---|
| 5,153,842 A | 10/1992 | Dlugos, Sr. et al. |
| 2006/0279527 A1* | 12/2006 | Zehner .................. G06Q 30/00 345/107 |
| 2010/0270373 A1* | 10/2010 | Poidomani et al. .......... 235/380 |
| 2011/0289023 A1* | 11/2011 | Forster et al. ................. 705/500 |
| 2012/0062367 A1 | 3/2012 | Warther |
| 2012/0211569 A1* | 8/2012 | Krawczewicz et al. ....... 235/492 |
| 2013/0080238 A1* | 3/2013 | Kelly et al. ................ 705/14.31 |
| 2013/0168444 A1* | 7/2013 | Hsieh et al. ................... 235/375 |
| 2014/0279126 A1* | 9/2014 | Schweiger ......... G06Q 30/0601 705/26.1 |

FOREIGN PATENT DOCUMENTS

| | | |
|---|---|---|
| DE | 19633945 A1 | 2/1998 |
| DE | 102006031422 A1 | 1/2008 |
| WO | 2011093780 A1 | 8/2011 |

* cited by examiner

*Primary Examiner* — Edwyn Labaze
(74) *Attorney, Agent, or Firm* — Laurence Greenberg; Werner Stemer; Ralph Locher

(57) ABSTRACT

A product has applied visible product information. In order to be able to undertake updates of the product information of such a product in a relatively simple manner, the product is equipped with an electronic monitor or screen for displaying the product information. A method for applying visible product information to a product is also provided.

12 Claims, 1 Drawing Sheet

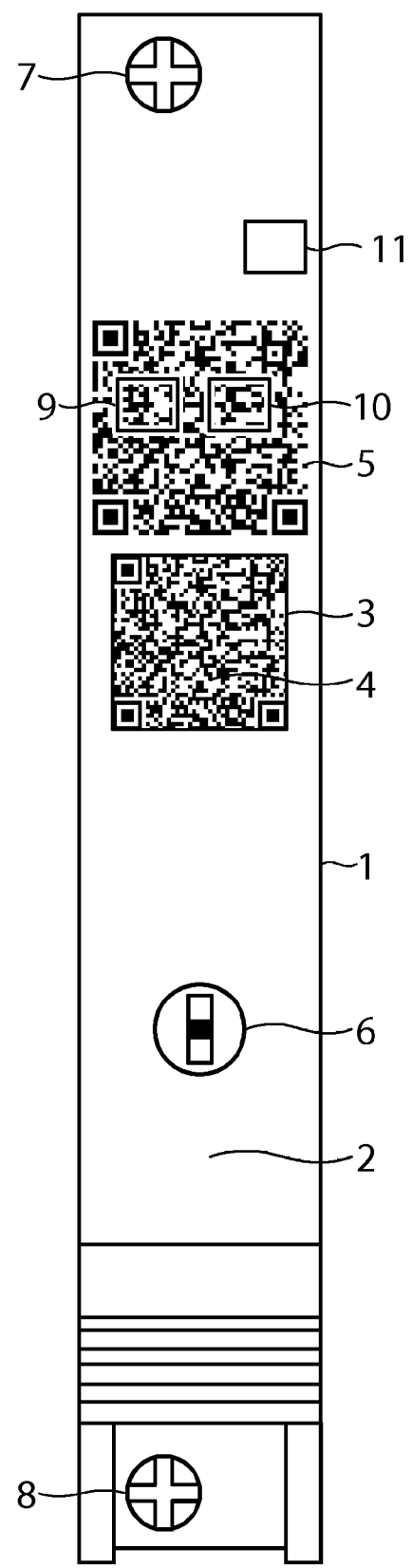

PRODUCT WITH APPLIED, VISIBLE PRODUCT INFORMATION AND METHOD FOR APPLYING VISIBLE PRODUCT INFORMATION TO A PRODUCT

CROSS-REFERENCE TO RELATED APPLICATIONS

This is a National Stage application under 35 U.S.C. §371, of International Application No. PCT/EP2013/063268, filed Jun. 25, 2013, which designated the United States; this application also claims the priority, under 35 U.S.C. §119, of German Patent Application DE 10 2012 212 026.2, filed Jul. 10, 2012; the prior applications are herewith incorporated by reference in their entirety.

BACKGROUND OF THE INVENTION

Field of the Invention

It is generally known to apply visible product information to products. In doing so, the product information is frequently applied to the product in encoded form, for example as a barcode. The packaging of the products, or specific labels affixed to the packaging for example, are used to carry the product information; product information attached in this manner frequently can be found on food, where it facilitates inter alia the stockkeeping and sales.

For technically more sophisticated and comparatively more expensive products two-dimensional codes are often used, which allow various types of product information to be accommodated on a relatively small surface. Such product information includes for example the version number of a technical device, as was applicable at the time of delivery of the device. If the software and/or firmware of the device is updated at a later date, the product information on the product is frequently not adjusted due to the outlay associated therewith, which can lead to considerable problems if the device is examined later on.

BREIF SUMMARY OF THE INVENTION

The object underlying the invention is therefore, in the case of a product with applied, visible product information, to create the possibility of being able to perform product information updates in a relatively simple manner.

In order to achieve this object according to the invention the product is fitted with an electronic monitor for displaying the product information.

The inventive product is especially advantageous insofar as it fundamentally offers the possibility through the use of an electronic monitor of being able to adapt the product information to the respective circumstances in a simple manner by amending the display on the monitor. In doing so, the refreshed readout of the amended product information does not cause any difficulties, because conventional scanners, code-readers and even smartphones can be used for this purpose.

In a particularly advantageous embodiment of the product according to the invention the monitor is equipped with an electronic input interface for acquiring electronic data containing the product information, by means of which there is the possibility of being able to perform a change or adaptation of the product information electronically from the outside.

The input interface can be embodied in a very different manner in the case of the product according to the invention; it is considered advantageous if the electronic input interface is an antenna, via which product information can be generated on the monitor wirelessly or at a distance if necessary.

It can also be advantageous to embody the electronic input interface as a bus input interface; this embodiment is preferred for example if the product is an electronic device.

Furthermore, it appears to be advantageous to design the electronic input interface as an infrared interface in the case of difficulties with connecting an electronic device to a monitor by means of cables.

In the case of the product according to the invention it can also be advantageous to have the product information be displayed as a barcode or two-dimensional code.

In order to ensure the display of the product information on the monitor even without an additional operating voltage supply, it is considered advantageous if an electronic memory integrated into the monitor is connected to a similarly integrated energy storage unit.

The invention offers particular advantages if the product is an updatable electronic unit having an electronic output interface, because in this case the product information can also be updated at the same time as the electronic unit. The electronic unit can be a complete electronic device, e.g. a controller, a so-called printed circuit board assembly as a component of a device or other assemblies.

The invention also relates to a method for applying visible product information to a product and has the object of embodying this method in such a manner that product information updates are able to be performed in a relatively simple manner.

In order to achieve this object the product information is made visible on an electronic monitor attached to the product.

This method similarly allows the same advantages to be achieved as had already been specified in connection with the product according to the invention.

In the case of the method according to the invention it is advantageous if a monitor having an electronic input interface for acquiring electronic data containing the product information is used, because product information can then be amended from the outside in a simple manner.

As with the product according to the invention, in the case of the method according to the invention an antenna, a bus interface or an infrared interface can be used as an electronic input interface depending on the situation.

Advantageously, in the case of the method according to the invention the product information can also be displayed as a barcode or two-dimensional code.

In order to be able to perform the method according to the invention even without an operating voltage source, a monitor with integrated electronic memory with attached, similarly integrated energy storage unit is used.

If an updatable electronic unit having an electronic output interface is used as product in the case of the method according to the invention, the product information can also be amended accordingly at the same time as when the unit is updated.

BRIEF DESCRIPTION OF THE SINGLE VIEW OF THE DRAWING

To further explain the invention, the figure shows a front view of an exemplary embodiment of the product according to the invention in the form of a printed circuit board assembly.

DESCRIPTION OF THE INVENTION

The figure shows a printed circuit board assembly 1 with a view of its narrow, end-face front panel 2. In the exemplary embodiment shown, the front panel 2 carries an affixed paper label 3, on which product information in the form of a two-dimensional code 4 is printed; this paper label is affixed to the printed circuit board assembly 1 once assembly has concluded.

A small, flat monitor 5, which initially has the same product information in the same two-dimensional code as the paper label 3, is fastened to the front panel 2. A reset button 6 is also located on the front panel 2. The front panel 1 also carries fastening screws 7 and 8, with which the printed circuit board assembly 1 is fastened on the front side (not shown) of a housing (similarly not shown in more detail). A circuit board, which together with the front panel 2 completes the printed circuit board assembly 1, extends at a right angle to the plane of the drawing. The circuit board can carry inter alia a controller.

The monitor 5 is equipped with an electronic input interface 9 for acquiring electronic data containing the product information. The electronic input interface 9 may be an antenna, a bus interface or an infrared interface. The monitor 5 has an electronic memory integrated therein and connected to a similarly integrated energy storage unit 10. The product may be an updatable electronic unit having an electronic output interface 11.

If during operation of the printed circuit board assembly 1 an update to its mode of operation is performed, the product information can then also be updated accordingly on the monitor 5 via the controller. The product information on the paper label 3 is then outdated and is therefore no longer read. Instead, the current product information on the monitor 5 is captured by means of a scanner, code-reader or a smartphone.

The invention claimed is:

1. A product having applied, visible product information, the product comprising:
    an electronic monitor fitted on the product for displaying the product information;
    said monitor being equipped with an electronic input interface for acquiring electronic data containing the product information; and
    the product being an updatable electronic unit having an electronic output interface for updating the product information at the same time as the electronic unit.

2. The product according to claim 1, wherein said electronic input interface is an antenna.

3. The product according to claim 1, wherein said electronic input interface is a bus interface.

4. The product according to claim 1, wherein said electronic input interface is an infrared interface.

5. The product according to claim 1, wherein the product information is displayed as a barcode or two-dimensional code.

6. The product according to claim 1, wherein said monitor has an electronic memory integrated therein and connected to a similarly integrated energy storage unit.

7. A method for applying visible product information to a product, the method comprising:
    displaying the product information so as to be visible on an electronic monitor attached to the product and having an electronic input interface;
    acquiring electronic data containing the product information by using the electronic input interface of the monitor;
    providing the product as an updatable electronic unit having an electronic output interface; and
    updating the product information at the same time as the electronic unit by using the electronic output interface of the updatable electronic unit.

8. The method according to claim 7, which further comprises providing an antenna as an electronic input interface.

9. The method according to claim 7, which further comprises providing a bus interface as an electronic input interface.

10. The method according to claim 7, which further comprises providing an infrared interface as an electronic input interface.

11. The method according to claim 7, which further comprises displaying the product information as a barcode or as a two-dimensional code.

12. The method according to claim 7, which further comprises providing the monitor with an integrated electronic memory to be connected to an attached, similarly integrated energy storage unit.

* * * * *